(12) United States Patent
Oliver et al.

(10) Patent No.: US 10,407,746 B2
(45) Date of Patent: *Sep. 10, 2019

(54) METHOD FOR MANUFACTURING AND UTILIZING FERRITIC-AUSTENITIC STAINLESS STEEL

(75) Inventors: James Oliver, Fjärdhundra (SE); Jan Y. Jonsson, Avesta (SE); Juho Talonen, Helsinki (FI); Rachel Petersson, Norrtälje (SE); Jan-Olof Andersson, Krylbo (SE)

(73) Assignee: OUTOKUMPU OYJ, Espoo (FI)

( * ) Notice: Subject to any disclaimer, the term of this patent is extended or adjusted under 35 U.S.C. 154(b) by 671 days.

This patent is subject to a terminal disclaimer.

(21) Appl. No.: 14/112,441

(22) PCT Filed: Apr. 18, 2012

(86) PCT No.: PCT/FI2012/050379
§ 371 (c)(1),
(2), (4) Date: Oct. 17, 2013

(87) PCT Pub. No.: WO2012/143610
PCT Pub. Date: Oct. 26, 2012

(65) Prior Publication Data
US 2014/0041766 A1 Feb. 13, 2014

(30) Foreign Application Priority Data

Apr. 29, 2010 (FI) .................................... 20100178
Oct. 28, 2011 (FI) .................................... 20110375

(51) Int. Cl.
*C21D 1/26* (2006.01)
*C21D 1/42* (2006.01)
(Continued)

(52) U.S. Cl.
CPC ............... *C21D 6/004* (2013.01); *C21D 1/26* (2013.01); *C21D 1/42* (2013.01); *C21D 6/002* (2013.01);
(Continued)

(58) Field of Classification Search
CPC . C21D 1/26; C21D 1/42; C21D 6/002; C21D 6/005
See application file for complete search history.

(56) References Cited

U.S. PATENT DOCUMENTS 3,567,434 A * 3/1971 Richardson et al. ... C22C 38/44
420/57
4,047,941 A * 9/1977 Wright .................... C22C 38/38
420/34

(Continued)

FOREIGN PATENT DOCUMENTS

EP     2172574 A1    4/2010
EP   2 258 885 A1 † 12/2010

(Continued)

OTHER PUBLICATIONS

Andersson, R., Deformation Characteristics of Stainless Steel, Doctoral Thesis, pp. i-131, Dec. 2005, Lulea University of Technology, Dept. of App. Physics and Mech. Eng., Lulea, Sweden.†

(Continued)

*Primary Examiner* — Cam N. Nguyen
(74) *Attorney, Agent, or Firm* — Robert P. Michal, Esq.; Carter, DeLuca & Farrell LLP

(57) ABSTRACT

The invention relates to a method for manufacturing a ferritic-austenitic stainless steel having good formability, good weldability and high elongation. The stainless steel containing the sum of carbon and nitrogen C+N in the range 0.17-0.295 in weight % in which sum C+N a lower carbon content to avoid sensitisation during welding is compen- (Continued)

Figure 1:
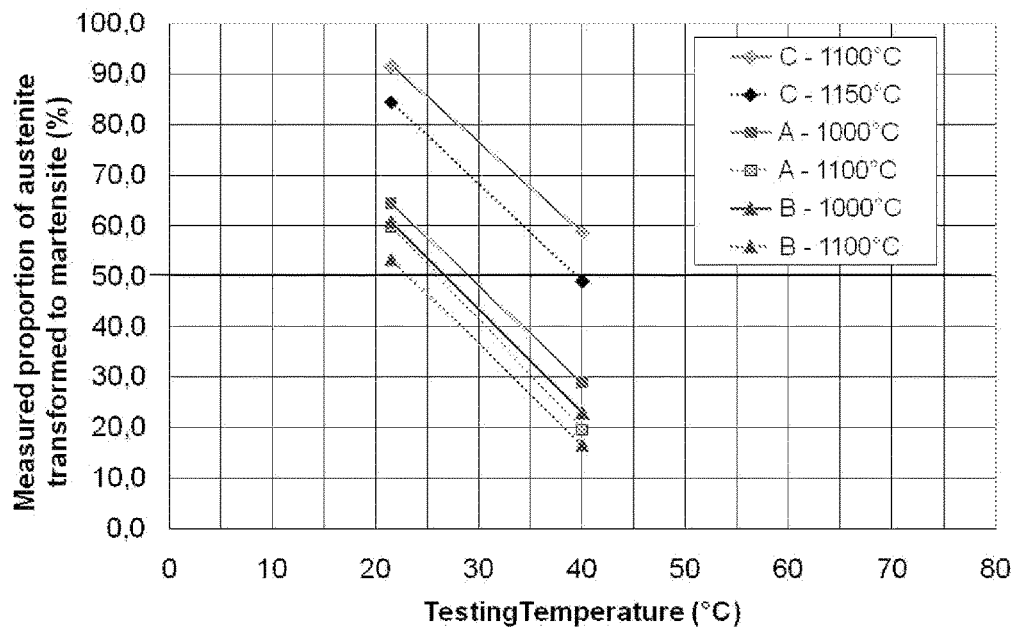

sated by an increased nitrogen content to maintain formability is heat treated so that the microstructure of the stainless steel contains 45-75% austenite in the heat treated condition, the remaining microstructure being ferrite, and the measured $M_{d30}$ temperature of the stainless steel is adjusted between 0 and 50° C. in order to utilize the transformation induced plasticity (TRIP) for improving the formability of the stainless steel.

15 Claims, 4 Drawing Sheets

(51) Int. Cl.
    *C21D 6/00*     (2006.01)
    *C22C 38/00*     (2006.01)
    *C22C 38/02*     (2006.01)
    *C22C 38/42*     (2006.01)
    *C22C 38/44*     (2006.01)
    *C22C 38/58*     (2006.01)

(52) U.S. Cl.
    CPC .......... *C21D 6/005* (2013.01); *C22C 38/001* (2013.01); *C22C 38/02* (2013.01); *C22C 38/42* (2013.01); *C22C 38/44* (2013.01); *C22C 38/58* (2013.01); *C21D 2211/001* (2013.01); *C21D 2211/005* (2013.01); *Y02P 10/253* (2015.11)

(56) References Cited

U.S. PATENT DOCUMENTS

| | | | | |
|---|---|---|---|---|
| 4,612,069 | A * | 9/1986 | Rainger | C22C 38/42 148/325 |
| 4,740,254 | A * | 4/1988 | Rainger | C22C 38/42 148/325 |
| 4,816,085 | A * | 3/1989 | Flasche | B23K 35/3086 148/327 |
| 4,964,925 | A * | 10/1990 | Hagenfeldt | A61L 27/042 148/325 |
| 5,238,508 | A * | 8/1993 | Yoshitake | C22C 38/001 148/325 |
| 5,298,093 | A * | 3/1994 | Okamoto | C22C 38/44 148/325 |
| 6,033,497 | A * | 3/2000 | Ryan | C21D 1/84 148/325 |
| 6,096,441 | A † | 8/2000 | Hauser | |
| 6,231,690 | B1 * | 5/2001 | Azuma | C23C 8/18 148/287 |
| 6,344,094 | B1 * | 2/2002 | Hineno | C21D 6/004 148/325 |
| 6,451,133 | B1 * | 9/2002 | Frodigh | C22C 38/44 148/325 |
| 6,761,777 | B1 * | 7/2004 | Radon | C22C 30/00 148/324 |
| 7,892,366 | B2 * | 2/2011 | Lindh | C21D 6/004 148/325 |
| 8,043,446 | B2 * | 10/2011 | Jung | C21D 6/004 148/327 |
| 9,822,434 | B2 * | 11/2017 | Samuelsson | C21D 8/02 |
| 9,856,551 | B2 * | 1/2018 | Alfonsson | C22C 38/42 |
| 2002/0015655 | A1 * | 2/2002 | Suzuki et al. | 420/46 |
| 2011/0097234 | A1 * | 4/2011 | Oikawa et al. | 420/38 |
| 2013/0032256 | A1 * | 2/2013 | Oliver | C22C 38/001 148/567 |

FOREIGN PATENT DOCUMENTS

| | | |
|---|---|---|
| EP | 2258885 A1 | 12/2010 |
| FI | 20100178 A | 10/2011 |
| JP | 2006-183129 A † | 7/2006 |
| WO | WO 2009119895 A1 * | 10/2009 |

OTHER PUBLICATIONS

Talonen, J. et al., Comparison of different methods for measuring strain induced a'-martensite content in austenitic steels, Materials Science and Technology vol. 20, pp. 1506-1512, Dec. 2004.†

\* cited by examiner
† cited by third party

METHOD FOR MANUFACTURING AND UTILIZING FERRITIC-AUSTENITIC STAINLESS STEEL

CROSS-REFERENCE TO RELATED APPLICATION

This is a national stage application filed under 35 USC 371 based on International Application No. PCT/FI2012/050379 filed Apr. 18, 2012, and claims priority under 35 USC119 of Finnish Patent Application No. 20110375 filed Oct. 28, 2011.

TECHNICAL FIELD

The present invention relates to a method for manufacturing and utilizing a lean ferritic-austenitic stainless steel with high strength, excellent formability and good corrosion resistance and good weldability. The formability is achieved by a controlled martensite transformation of the austenite phase resulting in a so called transformation-induced plasticity (TRIP). A low carbon content further improves the formability as well as the weldability of the steel manufactured.

BACKGROUND ART

Numerous lean ferritic-austenitic or duplex alloys have been proposed to combat the high costs of raw materials such as nickel and molybdenum with the main goal to accomplish adequate strength and corrosion performance. When referring to the following publications, the element contents are in weight %, if not anything else mentioned.

U.S. Pat. No. 3,736,131 describes an austenitic-ferritic stainless steel with 4-11% Mn, 19-24% Cr, up to 3.0% Ni and 0.12-0.26% N containing 10 to 50% austenite, which is stable and exhibits high toughness. The high toughness is obtained by avoiding austenite transformation to martensite.

U.S. Pat. No. 4,828,630 discloses duplex stainless steels with 17-21.5% Cr, 1 to less than 4% Ni, 4-8% Mn and 0.05-0.15% N that are thermally stable against transformation to martensite. The ferrite content has to be maintained below 60% to achieve good ductility.

EP patent 1327008 describes a lean duplex alloy with high strength, good ductility and high structural stability with 20-23% Cr, 3-8% Mn, 1.1-1.7% Ni and 0.15-0.30% N.

WO patent application 2006/071027 describes a low nickel duplex steel with 19.5-22.5% Cr, 0.5-2.5% Mo, 1.0-3.0% Ni, 1.5-4.5% Mn and 0.15-0.25% N having improved hot ductility compared to similar steels.

EP patent 1352982 disclosed a means of avoiding delayed cracking in austenitic Cr—Mn steels by introducing certain amounts of ferrite phase.

In recent years lean duplex steels have been used to a great extent and steels according to U.S. Pat. No. 4,848,630, EP patent 1327008, EP patent application 1867748 and U.S. Pat. No. 6,623,569 have been used commercially in a large number of applications. Outokumpu LDX 2101® duplex steel according to EP 1327008 has been widely used in storage tanks, transport vehicles, etc. These lean duplex steels have the same problem as other duplex steels, a limited formability which makes them less applicable for use in highly formed parts than austenitic stainless steels. Duplex steels have therefore a limited application in components such as plate heat exchangers. However, lean duplex steels have a unique potential to improved ductility as the austenite phase can be made sufficiently low in the alloy content to be metastable giving increased plasticity by a mechanism as described below.

There are a few references that are utilizing a metastable austenitic phase in duplex steels for improved strength and ductility. U.S. Pat. No. 6,096,441 relates austenitic-ferritic steels with high tensile elongation containing essentially 18-22% Cr, 2-4% Mn, less than 1% Ni and 0.1-0.3% N. A parameter related to the stability in terms of martensite formation shall be within a certain range resulting in improved tensile elongation. US patent application 2007/0163679 describes a very wide range of austenitic-ferritic alloys with high formability mainly by controlling the content of C+N in the austenite phase.

Transformation induced plasticity (TRIP) is a known effect for metastable austenitic steels. For example, local necking in a tensile test sample is hampered by the strain induced transformation of soft austenite to hard martensite conveying the deformation to another location of the sample and resulting in a higher uniform deformation. TRIP can also be used for ferritic-austenitic (duplex) steels if the austenite phase is designed correctly. The classical way to design the austenite phase for a certain TRIP effect is to use established or modified empirical expressions for the austenite stability based on its chemical composition, one of which is the $M_{d30}$ temperature. The $M_{d30}$ temperature is defined as the temperature at which 0.3 true strain yields 50% transformation of the austenite to martensite. However, the empirical expressions are established with austenitic steels and there is a risk to apply them on duplex stainless steels.

It is more complex to design the austenite stability of duplex steels since the composition of the austenite phase depends on both the steel chemistry and on the thermal history. Furthermore, the phase morphology and size influence the transformation behaviour. U.S. Pat. No. 6,096,441 has used an expression for the bulk composition and claims a certain range (40-115) which is required to obtain the desired effect. However, this information is only valid for the thermal history used for the steels in this particular investigation, as the austenite composition will vary with the annealing temperature. In US patent application 2007/0163679 the composition of the austenite was measured and a general $M_d$ formula for the austenite phase was specified to range from −30 to 90 for steels to show the desired properties.

Empirical formulas for the austenite stability are based on investigations of standard austenitic steels and can have a limited usability for the austenite phase in duplex steel as the conditions for stability are not restricted to the composition only but also to residual stresses and phase or grain parameters. As disclosed in US patent application 2007/0163679, a more direct way is to assess the stability of the martensite by measuring the composition of the austenite phase and then calculate the amount of martensite formation upon cold work. However, this is a very tedious and costly procedure and requires a high class metallurgical laboratory. Another way is to use thermodynamic databases to predict the equilibrium phase balance and compositions of each phase. However, such databases cannot describe the non-equilibrium conditions that prevail after thermo-mechanical treatments in most practical cases. An extensive work with different duplex compositions having a partly metastable austenite phase showed that the annealing temperatures and the cooling rates had a very large influence on the austenite content and the composition making predictions of the martensite formation based on the empirical expressions difficult. To be able to fully control the martensite formation in duplex steels, knowledge of the austenite composition together with micro-structural parameters seemed necessary but not sufficient.

DISCLOSURE OF THE INVENTION

In view of the prior art problems a proper way of the invention is instead to measure the $M_{d30}$ temperature for different steels and to use this information to design optimum compositions and manufacturing steps for high ductility duplex steels. Additional information obtained from measuring the $M_{d30}$ temperature is the temperature dependence for different steels. As forming processes occur at various temperatures it is of importance to know this dependence and to use it for modelling the forming behaviour.

The principal object of the present invention is to provide a controlled manufacturing method of strain induced martensite transformation in a lean duplex stainless steel to obtain excellent formability and good corrosion resistance as well as good weldability. Desired effects can be accomplished with the alloy mainly comprising (in weight %): less than 0.05% carbon (C), 0.2-0.7% silicon (Si), 2-5% manganese (Mn), 19-20.5% chromium (Cr), 0.8-1.5% nickel (Ni), less than 0.6% molybdenum (Mo), less than 1% copper (Cu), 0.16-0.26% nitrogen (N), the balance iron (Fe) and inevitable impurities occurring in stainless steels. The sum of C+N is in the range of 0.17-0.295% in which sum C+N a lower carbon content to avoid sensitisation during welding is compensated by an increased nitrogen content to maintain formability. Optionally the alloy can further contain one or more deliberately added elements; 0-0.5% tungsten (W), 0-0.2% niobium (Nb), 0-0.1% titanium (Ti), 0-0.2% vanadium (V), 0-0.5% cobalt (Co), 0-50 ppm boron (B), and 0-0.04% aluminium (Al). The steel can contain as inevitable trace elements as impurities less than 0.010 weight %, preferably less than 0.005 weight % sulphur (S), less than 0.040 weight % phosphorus (P) so that the sum sulphur and phosphorus (S+P) is less than 0.04 weight %, and the total oxygen (O) content is below 100 ppm. In a case of a metallic powder the maximum oxygen content can be up to 250 ppm.

The duplex steel according to the invention shall contain from 45 to 75% austenite in the heat-treated condition, the remaining phase being ferrite and no thermal martensite. The heat treatment can be carried out using different heat treatment methods, such as solution annealing, high-frequency induction annealing or local annealing, in the temperature range from 900 to 1200° C., advantageously from 1000 to 1150° C. To obtain the desired ductility improvement the measured $M_{d30}$ temperature shall be between zero and +50° C. Empirical formulas describing the correlation between the steel compositions and the thermo-mechanical treatments are to be used to design the optimum formability for said steels. The essential features of the present invention are enlisted in the appended claims.

An important feature of the present invention is the behaviour of the austenite phase in the duplex microstructure. Work with the different alloys showed that the desired properties are only obtained within a narrow compositional range. However, the main idea with the present invention is to disclose a procedure to obtain the optimum ductility with enhanced weldability of certain duplex alloys where the proposed steels represent examples with this effect. Nevertheless, the balance between the alloying elements is crucial since all the elements affect the austenite content, add to the austenite stability and influence strength and corrosion resistance. In addition, the size and morphology of the microstructure will affect the phase stability as well as strength of the material and have to be restricted for a controlled process.

Due to failures in predicting the formability behaviour of metastable ferritic-austenitic steels, a new concept or model is presented. This model is based on the measured metallurgical and mechanical values coupled with the empirical descriptions to select proper thermal-mechanical treatments for products with tailor-made properties.

Effects of different elements in the microstructure are described in the following, the element contents being described in weight %:

Carbon (C) partitions to the austenite phase and has a strong effect on austenite stability. Contrary to normal behaviour in stainless steels where carbides only precipitate when lowering the heat treatment temperature it has been found that in the present invention carbides can precipitate also when increasing the heat treatment temperature above a critical value. Such behaviour is detrimental to mechanical and corrosion properties obtained in autogenous welds and heat affected zone close to all types welds. This surprising effect can be understood from the shape of the austenite phase field as a function of temperature, here the triple point representing the three-phase equilibrium austenite, ferrite and carbide curves back to higher carbon content and lower chromium at higher temperatures. This effect causes the alloys composition with somewhat higher carbon content to move inside the three-phase region causing precipitation of carbides rather than remaining inside the desired two-phase field austenite-ferrite. To avoid this effect the carbon content shall be limited to a range of less than 0.05%, preferably to the range of less than 0.035%.

Nitrogen (N) is an important austenite stabilizer in duplex alloys and like carbon it increases the austenite stability. Nitrogen also increases strength, strain hardening and corrosion resistance. Published general empirical expressions on the $M_{d30}$ temperature indicate that nitrogen and carbon have the same strong influence on austenite stability but the present work shows a weaker influence of nitrogen in duplex alloys. Nitrogen can be added to stainless steels in larger extent than carbon without adverse effects on corrosion resistance. Furthermore, it is important to keep the austenite field as large as possible to avoid the detrimental welding effect of carbide precipitation, further addition of carbon, nitrogen and nickel is beneficial for the stability of austenite. The above mentioned limitation of carbon makes it necessary to otherwise stabilise the austenite with reduced carbon levels. In combination with the limited possibility for carbon alloying preferably both nitrogen and nickel is slightly increased. Both nitrogen and carbon have strong influence on the TRIP effect and too high values can reduce the desired TRIP optimum; from 0.16% up to 0.26% nitrogen can be accepted, and the sum of carbon and nitrogen C+N should be in the range of 0.17-0.295%, preferably 0.2-0.29% and more preferably 0.23-0.27% in order to maintain the austenite stability or even improve the austenite behaviour during deformation.

Silicon (Si) is normally added to stainless steels for deoxidizing purposes in the melt shop and should not be below 0.2%. Silicon stabilizes the ferrite phase in duplex steels but has a stronger stabilizing effect on austenite stability against martensite formation than shown in current expressions. For this reason silicon is maximized to 0.7%, preferably 0.6%, most preferably 0.4%.

Manganese (Mn) is an important addition to stabilize the austenite phase and to increase the solubility of nitrogen in the steel. By this manganese can partly replace the expensive nickel and bring the steel to the right phase balance. Too high levels will reduce the corrosion resistance. Manganese has a stronger effect on austenite stability against deformation martensite than indicated in published literature and the manganese content must be carefully addressed. The range of manganese shall be from 2.0 to 5.0%.

Chromium (Cr) is the main addition to make the steel resistant to corrosion. Being ferrite stabilizer chromium is also the main addition to create a proper phase balance between austenite and ferrite. To bring about these functions the chromium level should be at least 19% and to restrict the ferrite phase to appropriate levels for the actual purpose the maximum content should be 20.5%.

Nickel (Ni) is an essential alloying element for stabilizing the austenite phase and for good ductility and at least 0.8% must be added to the steel. Having a large influence on austenite stability against martensite formation nickel has to be present in a narrow range. Because of nickel's high cost and price fluctuation nickel should be maximized in actual steels to 1.5%, and preferably 1.35%.

Copper (Cu) is normally present as a residual of 0.1-0.5% in most stainless steels, as the raw materials to a great deal is in the form of stainless scrap containing this element. Copper is a weak stabilizer of the austenite phase but has a strong effect on the resistance to martensite formation and must be considered in evaluation of formability of the actual alloys. An intentional addition up to 1.0% can be made.

Molybdenum (Mo) is a ferrite stabilizer that can be added to increase the corrosion resistance. Molybdenum increases the austenite stability, and together with other additions molybdenum cannot be added to more than 0.6%.

Figure 2:
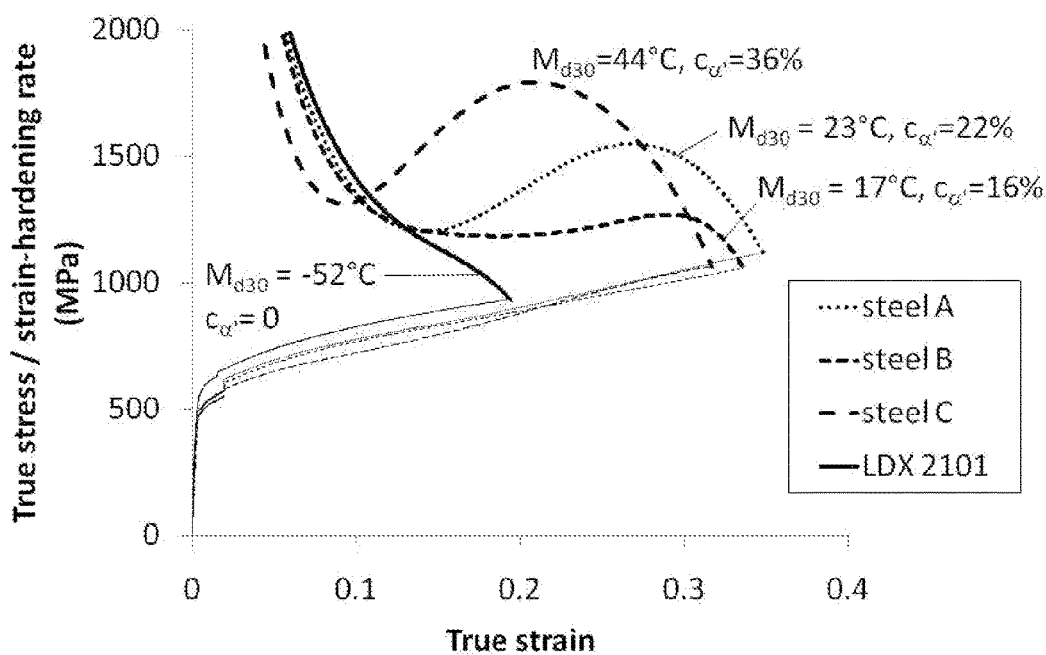
Figure 3A:
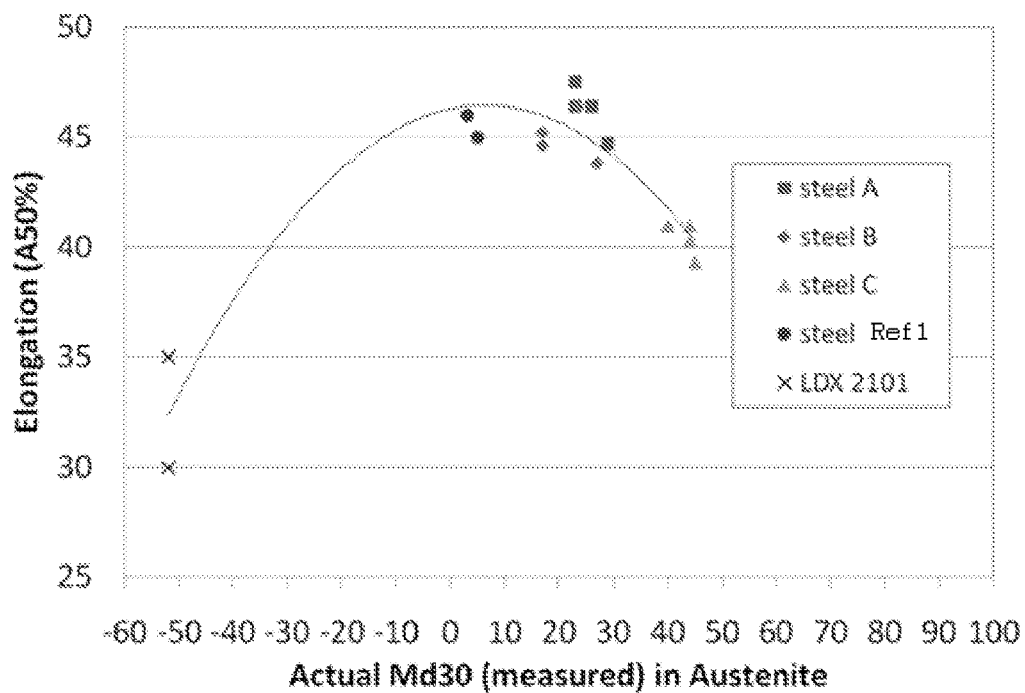
Figure 3B:
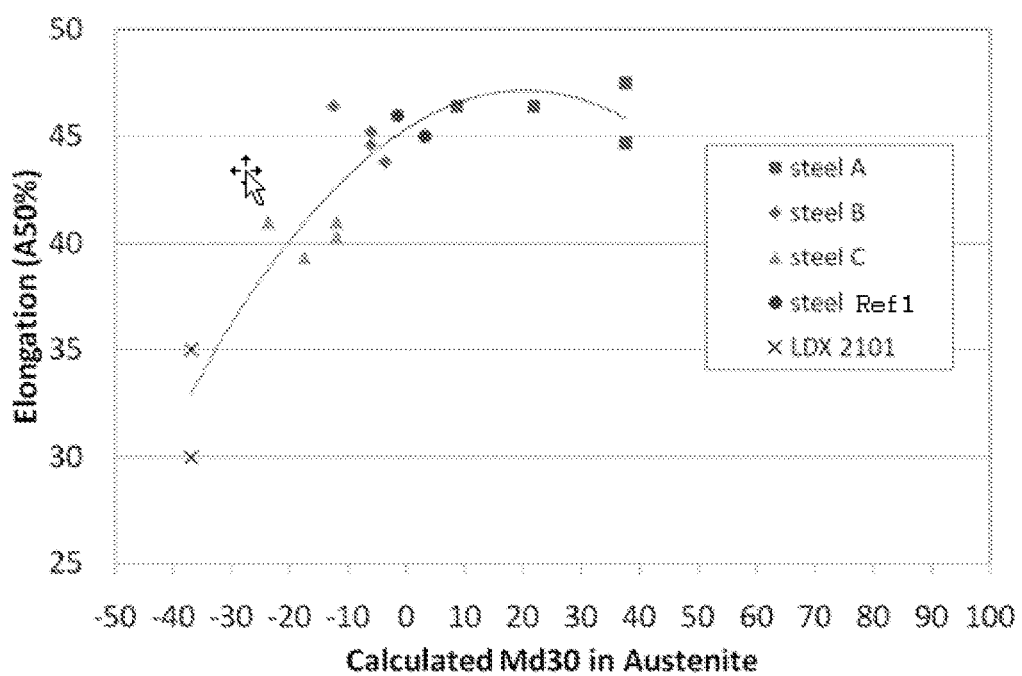
Figure 4:
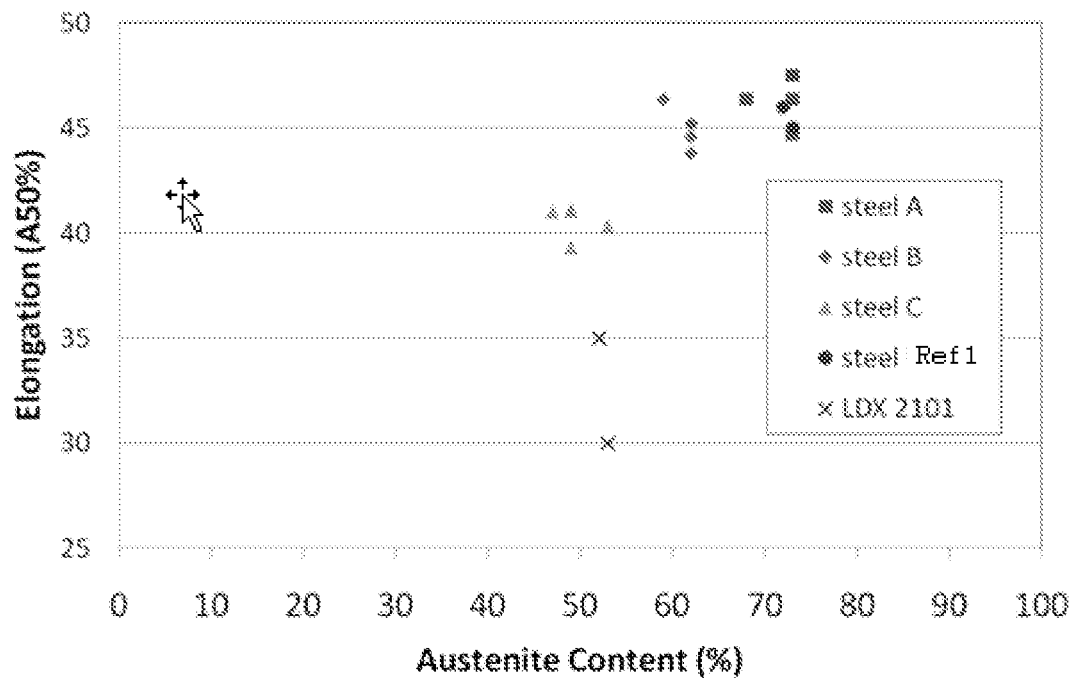
Figure 5:
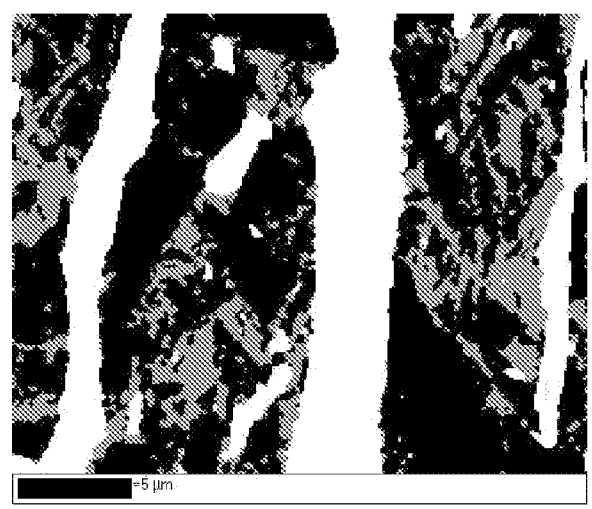
Figure 6:
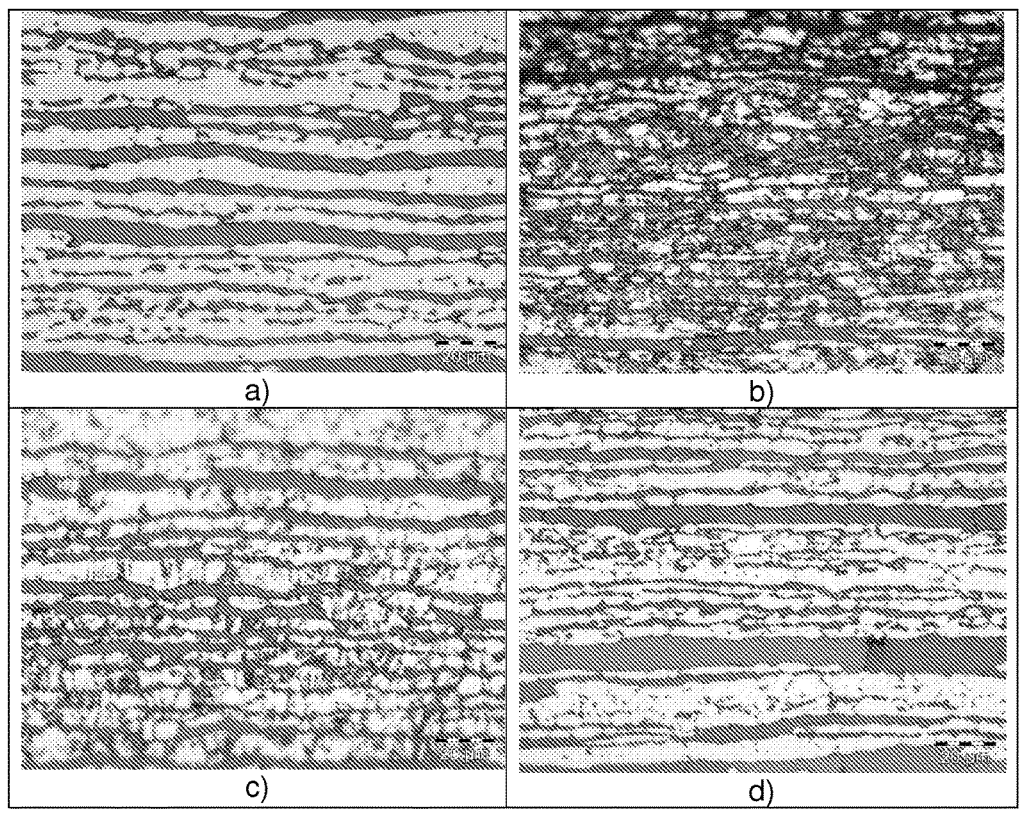
Figure 7:
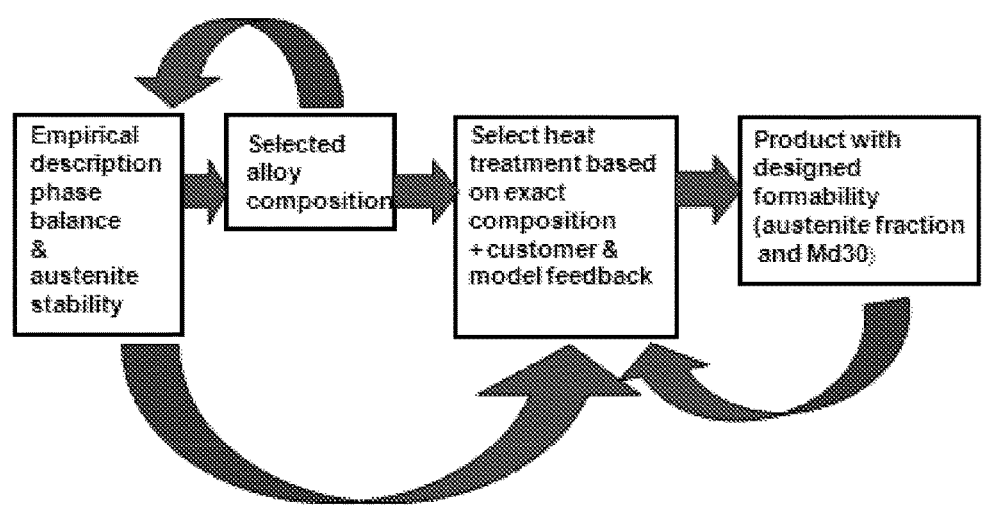

The present invention is described in more details referring to the drawings, where FIG. 1 is a diagram showing results of the $M_{d30}$ temperature measurement using Satmagan equipment, FIG. 2 shows the influence of the $M_{d30}$ temperature and the martensite content on strain-hardening and uniform elongation of the steels of the invention annealed at 1050° C., FIG. 3a shows the influence of the measured $M_{d30}$ temperature on elongation, FIG. 3b shows the influence of the calculated $M_{d30}$ temperature on elongation, FIG. 4 shows the effect of the austenite content on elongation, FIG. 5 shows the microstructure of the alloy A of the invention using electron backscatter diffraction (EBSD) evaluation when annealed at 1050° C., FIG. 6 shows the microstructures of the alloy B of the invention, when annealed at 1050° C., and FIG. 7 is a schematical illustration of the toolbox model.

Detailed studies of the martensite formation were performed for some lean duplex alloys. Particular attention was paid on the effect of austenite stability, martensite formation and $M_{d30}$ temperature on mechanical properties. This knowledge, crucial in designing a steel grade of optimum properties, is lacking from the prior art patents. Tests were done for some selected alloys according to Table 1.

TABLE 1

Chemical composition of tested alloys

| Alloy | C % | N % | C + N % | Si % | Mn % | Cr % | Ni % | Cu % | Mo % |
|---|---|---|---|---|---|---|---|---|---|
| A | 0.039 | 0.219 | 0.258 | 0.30 | 4.98 | 19.81 | 1.09 | 0.44 | 0.00 |
| B | 0.040 | 0.218 | 0.258 | 0.30 | 3.06 | 20.35 | 1.25 | 0.50 | 0.49 |
| C | 0.046 | 0.194 | 0.24 | 0.30 | 2.08 | 20.26 | 1.02 | 0.39 | 0.38 |
| D | 0.042 | 0.217 | 0.259 | 0.42 | 2.93 | 20.19 | 1.23 | 0.33 | 0.40 |
| E | 0.023 | 0.230 | 0.253 | 0.43 | 3.18 | 20.14 | 1.26 | 0.38 | 0.41 |
| Ref1 | 0.063 | 0.230 | 0.293 | 0.31 | 4.80 | 20.10 | 0.70 | 0.50 | 0.01 |
| LDX 2101 | 0.025 | 0.226 | 0.251 | 0.70 | 5.23 | 21.35 | 1.52 | 0.31 | 0.30 |

The alloys A, B, C, D and E are examples of the present invention. The alloy Ref1 is according to US patent application 2007/0163679, while LDX 2101 is a commercially manufactured example of EP 1327008, a lean duplex steel with an austenite phase that has good stability to deformation martensite formation.

The alloys A-C were manufactured in a vacuum induction furnace in 60 kg scale to small slabs that were hot rolled and cold rolled down to 1.5 mm thickness. The alloys D and E were produced in 100 ton scale followed by hot rolling and cold rolling to coil form with varying final dimensions. The alloy 2101 was commercially produced in 100 ton scale, hot rolled and cold rolled in coil form. For all tested alloys a heat treatment using solution annealing was done at different temperatures from 1000 to 1150° C., followed by rapid air cooling or water quenching.

The chemical composition of the austenite phase was measured using scanning electron microscope (SEM) with energy dispersive and wavelength dispersive spectroscopy analysis and the contents are listed in Table 2. The proportion of the austenite phase (% γ) was measured on etched samples using image analysis in light optical microscope.

TABLE 2

Composition of the austenite phase of the alloys after different treatments

| Alloy/treatment | C % | N % | Si % | Mn % | Cr % | Ni % | Cu % | Mo % | C + N % | % γ |
|---|---|---|---|---|---|---|---|---|---|---|
| A (1000° C.) | 0.05 | 0.28 | 0.28 | 5.37 | 18.94 | 1.30 | 0.59 | 0.00 | 0.33 | 73 |
| A (1050° C.) | 0.05 | 0.32 | 0.30 | 5.32 | 18.89 | 1.27 | 0.55 | 0.00 | 0.37 | 73 |
| A (1100° C.) | 0.06 | 0.35 | 0.28 | 5.29 | 18.67 | 1.32 | 0.54 | 0.00 | 0.41 | 68 |
| B (1000° C.) | 0.05 | 0.37 | 0.27 | 3.22 | 19.17 | 1.47 | 0.63 | 0.39 | 0.42 | 62 |
| B (1050° C.) | 0.06 | 0.37 | 0.27 | 3.17 | 19.17 | 1.52 | 0.57 | 0.40 | 0.43 | 62 |
| B (1100° C.) | 0.06 | 0.38 | 0.26 | 3.24 | 19.38 | 1.46 | 0.54 | 0.38 | 0.44 | 59 |
| C (1050° C.) | 0.07 | 0.40 | 0.26 | 2.25 | 19.41 | 1.32 | 0.51 | 0.27 | 0.47 | 53 |
| C (1100° C.) | 0.08 | 0.41 | 0.28 | 2.26 | 19.40 | 1.26 | 0.48 | 0.28 | 0.49 | 49 |
| C (1150° C.) | 0.09 | 0.42 | 0.25 | 2.27 | 19.23 | 1.27 | 0.46 | 0.29 | 0.51 | 47 |
| Ref1 (1050° C.) | 0.08 | 0.34 | 0.31 | 4.91 | 19.64 | 0.80 | 0.60 | 0.01 | 0.42 | 73 |
| Ref1 (1100° C.) | 0.09 | 0.35 | 0.31 | 5.00 | 19.51 | 0.79 | 0.52 | 0.01 | 0.44 | 72 |
| LDX 2101 (1050° C.) | 0.04 | 0.39 | 0.64 | 5.30 | 20.5 | 1.84 | 0.29 | 0.26 | 0.43 | 54 |

The actual $M_{d30}$ temperatures ($M_{d30}$ test temp) were established by straining the tensile samples to 0.30 true strain at different temperatures and by measuring the fraction of the transformed martensite (Martensite %) with Satmagan equipment. Satmagan is a magnetic balance, in which the fraction of ferromagnetic phase is determined by placing a sample in a saturating magnetic field and by comparing the magnetic and gravitational forces induced by the sample. The measured martensite contents and the resulting actual $M_{d30}$ temperatures ($M_{d30}$ measured) along with the predicted temperatures using Nohara expression $M_{d30}=551-462(C+N)-9.2Si-8.1Mn-13.7Cr-29(Ni+Cu)-18.5Mo-68Nb$ ($M_{d30}$ Nohara) for the austenite composition are listed in Table 3. The measured proportion of austenite transformed to martensite at true stain 0.3 versus testing temperature is illustrated in FIG. 1.

TABLE 3

Details of $M_{d30}$ measurements

| Alloy/treatment | Initial % γ | $M_{d30}$ test temp | Martensite % | Mart %/ Initial % γ | $M_{d30}$ ° C. measured | $M_{d30}$ ° C. (Nohara) |
|---|---|---|---|---|---|---|
| A (1000° C.) | 73 | 23° C. | 44 | 61 | 29 | 37 |
|  |  | 40° C. | 23 | 31 |  |  |
| A (1050° C.) | 73 | 23° C. | 36 | 50 | 23 | 22 |
|  |  | 40° C. | 17 | 23 |  |  |
|  |  | 60° C. | 4 | 5 |  |  |
| A (1100° C.) | 68 | 23° C. | 37 | 55 | 26 | 8.5 |
|  |  | 40° C. | 15 | 22 |  |  |
| B (1000° C.) | 62 | 23° C. | 35 | 57 | 27 | −4 |
|  |  | 40° C. | 17 | 27 |  |  |
| B (1050° C.) | 62 | 23° C. | 28 | 45 | 17 | −6 |
|  |  | 40° C. | 13 | 27 |  |  |
|  |  | 60° C. | 4 | 6 |  |  |
| B (1100° C.) | 59 | 23° C. | 30 | 51 | 23.5 | −13 |
|  |  | 40° C. | 13 | 23 |  |  |
| C (1050° C.) | 53 | 23° C. | 44 | 82 | 44 | −12 |
|  |  | 40° C. | 28 | 51 |  |  |
| C (1100° C.) | 49 | 23° C. | 44 | 89 | 45 | −18 |
|  |  | 40° C. | 29 | 58 |  |  |
| C (1150° C.) | 47 | 23° C. | 35 | 74 | 40 | −24 |
|  |  | 40° C. | 23 | 49 |  |  |
| D (1060° C.) | 56 | 23° C. | 26 | 47 | 27 | 23 |
|  |  | 40° C. | 12 | 22 |  |  |
| Ref1 (1050° C.) | 73 | 0° C. | 38 | 53 | 5 | 3 |
|  |  | 23° C. | 23 | 32 |  |  |
| Ref1 (1100° C.) | 72 | 0° C. | 37 | 52 | 3 | −2 |
|  |  | 23° C. | 19 | 26 |  |  |
| LDX 2101 (1050° C.) | 54 | −40° C. | 22 | 40 | −52 | −38 |
|  |  | 0° C. | 7 | 14 |  |  |
| LDX 2101 (1100° C.) | 52 | −40° C. | 18 | 34 | −59 | −48 |
|  |  | 0° C. | 8 | 15 |  |  |

Measurements of the ferrite and austenite contents were made using light optical image analysis after etching in Beraha's etchant and the results are reported in Table 4. The microstructures were also assessed regarding the structure fineness expressed as austenite width (γ-width) and austenite spacing (γ-spacing). These data are included in Table 4 as well as the uniform elongation (Ag) and elongation to fracture ($A_{50}/A_{80}$) results in longitudinal (long) and transversal (trans) directions.

TABLE 4

Micro-structural parameters, $M_{d30}$ temperatures and ductility data

| Alloy/treatment | % γ | γ-width (μm) | γ-spacing (μm) | $M_{d30}$ °C. measured | *$A_{50}$ % (long) | *$A_{50}$ % (trans) | Ag (%) (long) | Ag (%) (trans) |
|---|---|---|---|---|---|---|---|---|
| A (1000° C.) | 73 | 5.0 | 2.5 | 29 |  | 44.7 |  | 41 |
| A (1050° C.) | 73 | 4.2 | 2.2 | 23 | 47.5 | 46.4 | 43 | 42 |
| A (1100° C.) | 68 | 5.6 | 3.5 | 26 |  | 46.4 |  | 42 |
| B (1000° C.) | 62 | 2.8 | 2.2 | 27 |  | 43.8 |  | 38 |
| B (1050° C.) | 62 | 4.2 | 3.0 | 17 | 45.2 | 44.6 | 40 | 40 |
| B (1100° C.) | 59 | 4.7 | 4.1 | 23.5 |  | 46.4 |  | 41 |
| C (1050° C.) | 53 | 3.3 | 3.4 | 44 | 41.1 | 40.3 | 38 | 37 |
| C (1100° C.) | 49 | 4.5 | 4.7 | 45 |  | 40.8 |  | 37 |
| C (1150° C.) | 47 | 5.5 | 5.9 | 40 |  | 41.0 |  | 37 |
| D (1060° C.) 0.8 mm | 56 | 1.6 | 1.7 | — | 42.2 | 40.2 | 37.8 | 36.2 |
| D (1060° C.) 2 mm | 56 | 2.1 | 2.6 | 27 | 44.6 | 42.1 | 40.7 | 37.8 |
| E (1060° C.) 0.8 mm | 52 | 1.9 | 1.8 | — | 43.6 | 41.5 | 40.7 | 36.3 |
| E (1060° C.) 1.5 mm | 53 | 2.3 | 2.6 | — | 43.0 | 41.6 | 38.9 | 37.4 |
| Ref1 (1050° C.) | 73 | 4.9 | 2.4 | 5 |  |  | 38 | 39 |
| Ref1 (1100° C.) | 72 | 6.4 | 2.8 | 3 |  |  | 40 | 39 |
| LDX 2101 (1050° C.) | 54 | 2.9 | 3.3 | −52 | 36 | 30.0 | 24 | 21 |
| LDX 2101 (1100° C.) | 52 | 3.3 | 4.2 | −59 |  |  |  |  |

*Tensile tests performed according to standard EN10002-1

Examples of the resulting microstructures are shown in FIGS. 5 and 6. The results from tensile testing (standard strain rate 0.001 s$^{-1}$/0.008 s$^{-1}$) are presented in Table 5.

TABLE 5

Full tensile test data

| Alloy/treatment | Direction | Rp0.2 (MPa) | Rp1.0 (MPa) | Rm (MPa) | Ag (%) | $A_{50}$ (%) |
|---|---|---|---|---|---|---|
| A (1000° C.) | Trans | 480 | 553 | 825 |  | 45 |
| A (1050° C.) | Trans | 490 | 538 | 787 |  | 46 |
| A (1050° C.) | Long | 494 | 542 | 819 | 43 | 48 |
| A (1100° C.) | Trans | 465 | 529 | 772 |  | 46 |
| B (1000° C.) | Trans | 492 | 565 | 800 |  | 44 |
| B (1050° C.) | Trans | 494 | 544 | 757 |  | 45 |
| B (1050° C.) | Long | 498 | 544 | 787 | 40 | 45 |
| B (1100° C.) | Trans | 478 | 541 | 750 |  | 46 |
| C (1050° C.) | Trans | 465 | 516 | 778 |  | 40 |
| C (1050° C.) | Long | 474 | 526 | 847 | 38 | 41 |
| C (1100° C.) | Trans | 454 | 520 | 784 |  | 41 |
| C (1150° C.) | Trans | 460 | 525 | 755 |  | 41 |
| D (1060° C.) 0.8 mm | Trans | 603 | 674 | 839 | 38 | 42 |
| D (1060° C.) 1 mm | Trans | 610 | 672 | 836 | 37 | 41 |
| D (1060° C.) 2 mm | Trans | 564 | 615 | 806 | 38 | 42 |
| D (1000° C.) 4 mm | Trans | 488 | 559 | 806 | 39 | 44 |
| D (1050° C.) 4 mm | Trans | 480 | 552 | 782 | 40 | 45 |
| D (1100° C.) 4 mm | Trans | 490 | 558 | 763 | 42 | 48 |
| E (1080° C.) 0.8 mm | Trans | 572 | 651 | 809 | 36 | 41 |
| E (1080° C.) 1.5 mm | Trans | 594 | 637 | 800 | 37 | 42 |
| Ref1 (1050° C.) | Trans[1] | 548 | 587 | 809 |  | 45[2] |
| Ref1 (1050° C.) | Long[1] | 552 | 590 | 835 | 38 | 44[2] |
| Ref1 (1100° C.) | Trans[1] | 513 | 556 | 780 |  | 46[2] |
| Ref1 (1100° C.) | Long[1] | 515 | 560 | 812 | 40 | 47[2] |
| LDX 2101 (1050° C.) | Trans | 602 | 632 | 797 | 21 | 30 |

TABLE 5-continued

Full tensile test data

| Alloy/treatment | Direction | Rp0.2 (MPa) | Rp1.0 (MPa) | Rm (MPa) | Ag (%) | A$_{50}$ (%) |
|---|---|---|---|---|---|---|
| LDX 2101 (1050° C.) | Long | 578 | 611 | 790 | 24 | 36 |

[1] Strain rate 0.00075 s$^{-1}$/0.005 s$^{-1}$
[2] A$_{80}$

To investigate the resistance to corrosion, the pitting potentials of the alloys were measured on samples, which were wet-ground to 320 mesh surface finish in 1M NaCl solution at 25° C. using Standard Calomel electrode with a voltage scan of 10 mV/min. Three individual measurements were made for each grade. The results are shown in Table 6.

TABLE 6

Pitting corrosion tests

| Alloy | Result 1 mV | Result 2 mV | Result 3 mV | Average mV | Std dev mV | Max mV | Min mV |
|---|---|---|---|---|---|---|---|
| A | 341 | 320 | 311 | 324 | 15 | 17 | 13 |
| B | 380 | 400 | | 390 | 14 | 10 | 10 |
| C | 328 | 326 | 276 | 310 | 29 | 18 | 34 |
| Ref1 | 275 | 283 | 235 | 264 | 16 | 19 | 29 |
| 304L | 373 | 306 | 307 | 329 | 38 | 44 | 23 |

The Critical Pitting Temperature (CPT) was measured to the alloys according to ASTM G150 in 0.1M NaCl on the as-received surfaces. The results are shown in table 7.

TABLE 7

Critical pitting temperatures

| | Result 1 | Result 2 | average |
|---|---|---|---|
| A 1.5 mm | 9.2 | 8.2 | 8.7 |
| B 1.5 mm | 19.0 | 19.5 | 19.2 |
| C 1.5 mm | 9.8 | 9.8 | 9.8 |
| D 0.8 mm | 17.5 | 19.0 | 18.3 |
| D 1.0 mm | 17.6 | 19.6 | 18.6 |
| D 2.0 mm | 21 | 23 | 22 |
| D 4.0 mm | 22.7 | 23.1 | 22.9 |
| E 0.8 mm | 20.5 | 22.3 | 21.4 |
| E 1.5 mm | 16.8 | 17.0 | 16.9 |
| LDX 2101 | | | 26 |
| 304L | | | 14 |

The results show that the most values of the critical pitting temperatures for the alloys according to the invention are between the typical values of the critical pitting temperatures of the reference alloys.

The critical pitting temperature was also measured on the alloy D and E after autogenous TIG weld bead on a plate. Results are given in table 8.

TABLE 8

CPT temperature for autogenous TIG welded material

| | Result 1 | Result 2 | average |
|---|---|---|---|
| D 1.0 mm | <5 | <5 | <5 |
| D 0.8 mm | 20.2 | 22.1 | 20.6 |
| E 0.8 mm | 22.2 | 20.3 | 21.2 |

Further, the susceptibility to intergranular attack on the bead on plate materials was evaluated by observing and classifying the etched microstructures in accordance with ASTM A262 practice A. Results are given in table 9.

TABLE 9

Susceptibility to intergranular attack for autogenous TIG welded material

| | Microstructure as defined by ASTM A262 |
|---|---|
| D 1.0 mm | Ditch structure |
| E 0.8 mm | Dual structure |

The ditch structure in the table 9 means that in the microstructure one or more grains are completely surrounded by ditches. A dual structure contains some ditches but no one grain is completely surrounded. The lower CPT for welded 1.0 mm material D is thus correlated to the observation that this microstructure has been slightly sensitised. However, good CPT values were obtained as shown in table 8 for welded 0.8 mm material D.

Table 2 reveals that the phase balance and composition of the austenite phase vary with the solution annealing temperature. The austenite content decreases with increasing temperature. The compositional change in substitutive elements is small while the interstitial elements carbon and nitrogen show greater variation. As the carbon and nitrogen elements according to available formulas have a strong effect on the austenite stability against martensite formation, it appears to be crucial to control their level in the austenite. As shown in Table 3, the calculated $M_{d30}$ temperatures are clearly lower for the heat treatments at higher temperature, indicating a greater stability. However, the measured $M_{d30}$ temperatures do not display such dependence. For the alloys A, B and C the $M_{d30}$ temperature is slightly reduced with just 3-4° C. when increasing the solution temperature with 100° C. This difference can be attributed to several effects. For example, the higher annealing temperature results in a coarser microstructure, which is known to affect the martensite formation. The tested examples have an austenite width or an austenite spacing in the order of about 2 to 6 μm. The products with the coarser microstructure show different stability and deviating description. The results show that the prediction of the martensite formation using current established expressions is not functional, even if advanced metallographic methods are employed.

In FIG. 1 the results from Table 3 are plotted and the curves show that the influence of temperature on the martensite formation is similar for the tested alloys. Such dependence is an important part of the empirical descriptions for designed formability, as in industrial forming processes temperature can vary considerably.

FIG. 2 illustrates the strong influence of the $M_{d30}$ temperature of the austenite (measured) and the amount of the transformed strain-induced martensite ($c_{\alpha'}$) on the mechanical properties. In FIG. 2, the true stress-strain curves of the tested steels are shown with thin lines. The thick lines correspond to the strain-hardening rate of the steels, obtained by differentiating the stress-strain curves. According to Considére's criterion, the onset of necking, corresponding to uniform elongation, occurs at the intersection of the stress-strain curve and the strain-hardening curves, after which the strain-hardening cannot compensate the reduction of the load bearing capacity of the material caused by thinning.

The $M_{d30}$ temperatures and the martensite contents at uniform elongation of the tested steels are also shown in FIG. 2. It is obvious that the strain-hardening rate of the steel is essentially dependent on the extent of martensite formation. The more martensite is formed, the higher strain-hardening rate is reached. Thus, by carefully adjusting the $M_{d30}$ temperature, the mechanical properties, namely the combination of tensile strength and uniform elongation can be optimized.

Apparently, based on the present experimental results, the range of optimum $M_{d30}$ temperature is substantially narrower than indicated by the prior art patents. A too high $M_{d30}$ temperature causes rapid peaking of the strain-hardening rate. After peaking the strain-hardening rate drops rapidly, resulting in early onset of necking and low uniform elongation. According to the experimental results, the $M_{d30}$ temperature of the steel C appears to be close to the upper limit. If the $M_{d30}$ temperature was much higher, the uniform elongation would be substantially decreased.

On the other hand, if the $M_{d30}$ temperature is too low, not enough martensite is formed during deformation. Therefore, the strain-hardening rate remains low, and consequently, the onset of necking occurs at a low strain level. In FIG. 2, LDX 2101 represents typical behaviour of a stable duplex steel grade with low uniform elongation. The $M_{d30}$ temperature of the steel B was 17° C., which was high enough to enable a sufficient martensite formation to ensure the high elongation. However, if the $M_{d30}$ temperature was even lower, too little martensite would form and the elongation would be clearly lower.

Based on the experiments, the chemical composition and the thermo-mechanical treatments shall be designed so that the resulting $M_{d30}$ temperature of the steel ranges is between 0 and +50° C., preferably between 10° C. and 45° C., and more preferably 20-35° C.

The tensile test data in Table 5 illustrates that the elongation at fracture is high for all steels according to the invention while the commercial lean duplex steel (LDX 2101) with a more stable austenite exhibits lower elongation values typical for standard duplex steels. FIG. 3a illustrates the influence of the measured $M_{d30}$ temperatures of the austenite on the ductility. For the actual examples an optimum ductility is obtained for the $M_{d30}$ temperatures between 10 and 30° C.

In FIG. 3b the influence of the calculated $M_{d30}$ temperatures on ductility is plotted.

Both the diagrams, FIG. 3a and FIG. 3b, illustrate clearly that there is an almost parabolic correlation between the $M_{d30}$ temperature values and the elongation regardless of how the $M_{d30}$ temperature has been obtained. There is a clear discrepancy between the measured and calculated $M_{d30}$ values in particular for alloy C. The diagrams show that the desired range of the $M_{d30}$ temperature is much narrower than the calculations predict, which means that the process control needs to be much better optimized to obtain a desired TRIP effect. FIG. 4 shows that the austenite content for the optimum ductility ranges from about 50 to 70% for the used examples. In FIG. 5 the $M_{d30}$ temperature of the alloy A is tested at 40° C. having in the microstructure 18% martensite (grey in image) and about 30% of austenite (black in image) the rest being ferrite (white in image).

FIG. 6 shows the microstructures of the alloy B of the invention after annealed at 1050° C. The phases in FIG. 6 are ferrite (grey), austenite (white) and martensite (dark grey within the austenite (white) bands) In FIG. 6 the part a) relates to a reference material, the part b) relates to the $M_{d30}$ temperature test performed at room temperature, the part c) relates to the $M_{d30}$ temperature test performed at 40° C. and the part d) relates to the $M_{d30}$ temperature test performed at 60° C.

The control of the $M_{d30}$ temperature is crucial to attain high deformation elongation. It is also important to take the material temperature during deformation into consideration as it largely influences the amount of martensite that can form. Data in Table 5 and in FIGS. 3a and 3b refers to room temperature tests but some increase in temperature cannot be avoided due to adiabatic heating. Consequently, steels with a low $M_{d30}$ temperature may not show a TRIP effect if deformed at an elevated temperature while steels having an apparently too high $M_{d30}$ temperature for optimum ductility at room temperature will show excellent elongation at elevated temperatures. The tensile tests with the alloys A and C at different temperatures (Table 10) showed the following relative changes in elongation:

TABLE 10

The tensile tests with the Alloys A and C at different temperatures

| Alloy | Temperature | | |
|---|---|---|---|
| | 20° C. | 45° C. | 65° C. |
| A | 100% | 100% | 85% |
| C | 100% | 120% | 115% |

The results show that the alloy A with lower $M_{d30}$ temperature exhibits a reduction in elongation at elevated temperature, while the alloy C with the higher $M_{d30}$ temperature demonstrates an increased elongation when the temperature is raised.

Table 6 shows that the pitting corrosion resistance, expressed as pitting potential in 1M NaCl, is at least as good as that of the austenitic standard steel 304L.

Prior art has not disclosed sufficient capability to design duplex steels with TRIP-effect properly as the predictions of the steel behaviour using established formulas are unsecure giving too wide ranges in the compositions and in other specifications. According to the present invention lean duplex steels can be more safely designed and manufactured with optimum ductility as well as good welding properties by selecting certain composition ranges and by using a special procedure involving measurement of the actual $M_{d30}$ temperature and by employing special empirical knowledge to control the manufacturing processes. This new innovative approach is necessary to be able to utilize the real TRIP effect in the design of highly formable products. As illustrated in FIG. 7 a toolbox concept is used where empirical models for the phase balance and the austenite stability based on the measurements are used to select the alloy compositions that will be subjected to special thermal-mechanical treatments for designed formability (the austenite fraction and the $M_{d30}$ temperature). By this model it is possible to design the austenite stability giving the optimum formability for a certain customer or solution application with a greater flexibility than for austenitic stainless steels exhibiting TRIP effect. For such austenitic stainless steels, the only way to adjust the TRIP effect is to choose another melt composition, while according to the present invention utilizing TRIP effect in a duplex alloy, the heat treatment such as the solution annealing temperature gives an opportunity to fine-tune the TRIP effect without necessarily introducing a new melt. However, as described in the section regarding carbon and nitrogen, special considerations must be taken into account concerning carbon and nitrogen levels. The carbon content must be selected in such a way that high temperature carbides are avoided and weldability is improved.

The duplex ferritic austenitic steel manufactured in accordance with the invention can be produced as castings, ingots, slabs, blooms, billets and flat products such as plates, sheets, strips, coils, and long products such as bars, rods, wires, profiles and shapes, seamless and welded tubes and/or pipes. Further, additional products such as metallic powder, formed shapes and profiles can be produced.

The invention claimed is:

1. Method for manufacturing a ferritic-austenitic stainless steel having good formability, good weldability and high elongation, wherein the stainless steel contains in weight % less than 0.05% C, 0.2-0.7% Si, greater than 4-5% Mn, 19-20.5% Cr, 0.8-1.5% Ni, less than 0.6% Mo, less than 1% Cu, 0.16-0.26% N, the balance Fe and inevitable impurities, and a sum of carbon and nitrogen C+N in a range 0.17-0.295 in weight %, such that the carbon content depends upon the nitrogen content, and a lower carbon content used to avoid sensitization during welding is compensated by an increased nitrogen content to maintain formability, and wherein the stainless steel is subjected to at least one heat treatment of 900-1200° C. so that a microstructure of the stainless steel contains 45-75% austenite in the heat treated condition, a remaining microstructure being ferrite, and a measured $M_{d30}$ temperature of the ferritic-austenitic stainless steel is adjusted between 0 and 50° C. in order to utilize transformation induced plasticity (TRIP) for improving formability of the stainless steel.

2. Method according to claim 1, wherein the $m_{d30}$ temperature of the stainless steel is measured by straining the stainless steel and by measuring a fraction of transformed martensite.

3. Method according to claim 1 wherein the heat treatment is carried out as solution annealing.

4. Method according to claim 1 wherein the heat treatment is carried out as high-frequency induction annealing.

5. Method according to claim 1 wherein the heat treatment is carried out as local annealing.

6. Method according to claim 1 wherein the measured $m_{d30}$ temperature is adjusted between 10 and 45° C.

7. Method according to claim 1 wherein the stainless steel contains the sum C+N 0.2-0.29 weight %.

8. Method according to claim 1 wherein the stainless steel contains the sum C+N 0.23-0.27 weight %.

9. Method according to claim 1, wherein the stainless steel optionally contains one or more added elements; 0-0.5 weight % W, 0-0.2 weight % Nb, 0-0.1 weight % Ti, 0-0.2 weight % V, 0-0.5 weight % Co, 0-50 ppm B, and 0-0.04 weight % Al.

10. Method according to claim 1 wherein the stainless steel contains as inevitable impurities less than 0.010 weight %, less than 0.005 weight % S, less than 0.040 weight % P so that the sum (S+P) is less than 0.04 weight %, and the total oxygen content is below 100 ppm.

11. Method according to claim 1 wherein the stainless steel contains in weight % less than 0.035% C.

12. Method according to claim 1 wherein the stainless steel contains in weight % 1.0-1.35% Ni.

13. Method according to claim 1 wherein the stainless steel contains in weight % 0.18-0.24% N.

14. Method according to claim 1 wherein the stainless steel is produced as castings, ingots, slabs, blooms, billets, plates, sheets, strips, coils, bars, rods, wires, profiles and shapes, seamless and welded tubes and/or pipes, metallic powder, formed shapes and profiles.

15. Method for manufacturing a ferritic-austenitic stainless steel having good formability, good weldability and high elongation, wherein the stainless steel contains in weight % less than 0.05% C, 0.2-0.7% Si, greater than 4-5% Mn, 19-20.5% Cr, 0.8-1.5% Ni, less than 0.6% Mo, less than 1% Cu, 0.16-0.26% N, 0-0.5% W, the balance Fe and inevitable impurities, and a sum of carbon and nitrogen C+N in a range 0.17-0.295 in weight %, such that the carbon content depends upon the nitrogen content, and a lower carbon content used to avoid sensitization during welding is compensated by an increased nitrogen content to maintain formability, and wherein the stainless steel is subjected to at least one heat treatment of 900-1200° C. so that a microstructure of the stainless steel contains 45-75% austenite in the heat treated condition, a remaining microstructure being ferrite, and a measured $M_{d30}$ temperature of the ferritic-austenitic stainless steel is adjusted between 0 and 50° C. in order to utilize transformation induced plasticity (TRIP) for improving formability of the stainless steel.

* * * * *